United States Patent
Adolph et al.

(10) Patent No.: US 7,634,174 B2
(45) Date of Patent: Dec. 15, 2009

(54) METHOD DATA RECORDER FOR RECORDING DATA PACKET TIMESTAMPS

(75) Inventors: Dirk Adolph, Ronnenberg (DE); Wolfgang Klausberger, Hannover (DE); Hui Li, Hannover (DE); Ralf Ostermann, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1910 days.

(21) Appl. No.: 10/380,372

(22) PCT Filed: Sep. 3, 2001

(86) PCT No.: PCT/EP01/10121

§ 371 (c)(1),
(2), (4) Date: Mar. 14, 2003

(87) PCT Pub. No.: WO02/23911

PCT Pub. Date: Mar. 21, 2002

(65) Prior Publication Data

US 2004/0019819 A1 Jan. 29, 2004

(51) Int. Cl.
*H04N 5/00* (2006.01)
*H04N 5/91* (2006.01)
*H04N 7/00* (2006.01)

(52) U.S. Cl. .............. 386/125; 386/95; 386/98; 386/46; 386/83

(58) Field of Classification Search ............. None
See application file for complete search history.

(56) References Cited

U.S. PATENT DOCUMENTS 6,108,486 A * 8/2000 Sawabe et al. ............. 386/98
6,320,825 B1 * 11/2001 Bruekers et al. ........... 369/30.17
7,079,753 B2 * 7/2006 Ando et al. ................ 386/95
7,197,234 B1 * 3/2007 Chatterton ................. 386/95
7,424,209 B2 * 9/2008 Mazur ....................... 386/125
7,496,283 B2 * 2/2009 Evans et al. ............... 386/124
2004/0101273 A1 * 5/2004 Winter et al. .............. 386/46

FOREIGN PATENT DOCUMENTS

EP    986 248 A1    3/2000

* cited by examiner

*Primary Examiner*—Thai Tran
*Assistant Examiner*—Heather R Jones
(74) *Attorney, Agent, or Firm*—Robert D. Shedd; Paul P. Kiel; Guy H. Eriksen

(57) ABSTRACT

DVD Rewritable/Re-recordable discs will be used for recording and playing back digital bitstreams, for example MPEG data packets. To enable proper real-time playback of stored MPEG transport packets, a time information is to be added to every data packet to be recorded. A DVD streamer is connected to the application device via an interface, e.g. IEEE 1394. The interface internally uses timestamps having a special format. According to the invention, such interface-generated timestamps are also used for the DVD stream recording, instead of additionally generated independent streamer-specific timestamps. However, a timestamp format conversion is to be carried out because the DVD Streamer timestamp format is different from the IEEE 1394 timestamp format. For such timestamp format conversion differences between consecutive IEEE 1394 timestamps are determined and are used for calculating the DVD stream recording timestamps.

10 Claims, 1 Drawing Sheet

METHOD DATA RECORDER FOR RECORDING DATA PACKET TIMESTAMPS

Figure 1:
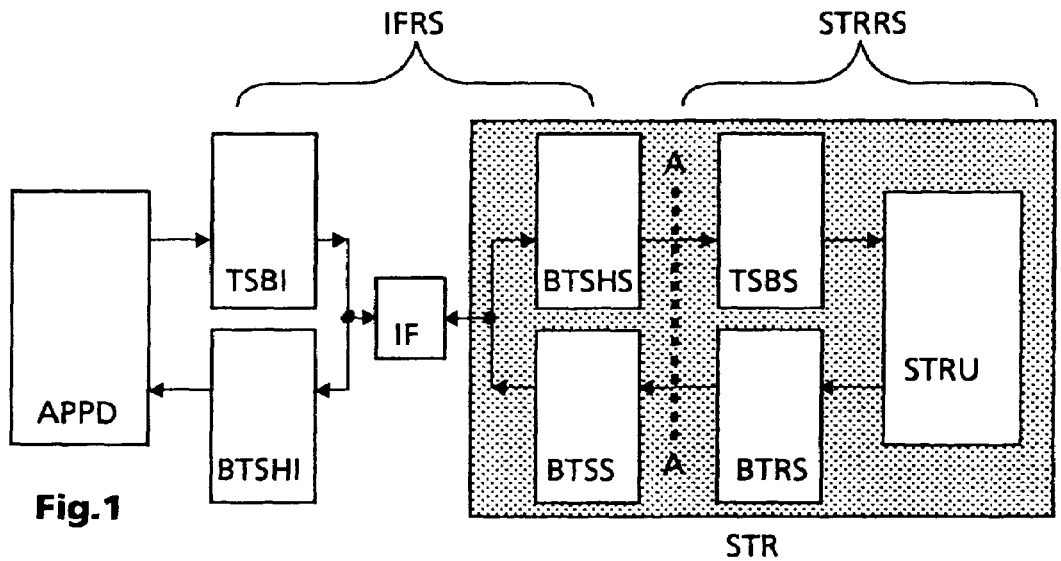

This application claims the benefit under 35 U.S.C. §365 of International Application PCT/EP01/10121, filed Sep. 3, 2001, which claims the benefit of European Application No. 00250307.6, filed Sep. 16, 2000.

The invention relates to a method and to a data recorder for converting first data packet timestamps based on a first clock rate to second data packet timestamps based on a second clock rate, for bitstream recording or replaying.

BACKGROUND

DVD (digital versatile disc) stream recording will be finally specified soon and concerns DVD Rewritable/Re-recordable discs for recording and playing back digital bitstreams including for example MPEG data packets as specified in ISO/IEC 11172, 13818 or 14496. To enable proper real-time playback, e.g. of stored MPEG-2 transport packets according to the DVB-S standard ETS 300 421, a time information is to be added to every data packet to be recorded.

In WO-A-00/14952 of the applicant it is proposed to use original IEEE 1394 timestamps also in a DVD stream recorder.

INVENTION

When recording, a DVD streamer receives a data stream from an application device. When replaying, the streamer outputs the replayed data stream to the same or another application device.

A problem to be solved by the invention is to efficiently provide reference time information required for replaying recorded data packets. This problem is solved by the method disclosed in claim 1.

A data recorder that utilises this method is disclosed in claim 6.

A DVD streamer is connected to the application device via an interface. In a home network environment using e.g. IEEE 1394 interfaces, the interface timing generation, or timestamping, and the corresponding interface time reference regeneration is executed in a special IEEE 1394 format.

Such interface-generated timestamps could also be used for the DVD stream recording, instead of additionally generating independent streamer-specific timestamps. However, to perform DVD stream recording, a timestamp format conversion is to be carried out because the required DVD Streamer timestamp format is different from above IEEE 1394 timestamp format. The DVD stream recording timestamp format is a 48 bit format using a 27.000 MHz clock frequency according the DVD Specifications for Rewritable/Re-recordable Discs, Part 5 Stream Recording.

According to the invention, a format conversion is carried out wherein the differences between consecutive interface timestamps are determined and are used for calculating the DVD stream recorder timestamps for the recording. Advantageously, the wraparound-burdened IEEE 1394 timestamps can be converted into the DVD stream recording format thereby avoiding division operations on very long integer data types or floating point operations.

In principle, the inventive method is suited for converting first data packet timestamps $PAT_A$ based on a first clock rate to second data packet timestamps $PAT_B$ based on a second clock rate, said clock rates having a ratio B/A, A being derived from said first clock rate and B being derived from said second clock rate, said method including the steps:

if no $PAT_A$ timestamp wraparound takes place, calculating:

$$D(i)=((PAT_A(i)-PAT_A(i-1))*B+R(i-1))/A$$

$$R(i)=((PAT_A(i)-PAT_A(i-1))*B+R(i-1)) \bmod A;$$

if a $PAT_A$ timestamp wraparound takes place between i−1 and i, calculating:

$$D(i)=((PAT_A(i)+PAT\_M-PAT_A(i-1))*B+R(i-1))/A$$

$$R(i)=((PAT_A(i)+PAT\_M-PAT_A(i-1))*B+R(i-1)) \bmod A,$$

wherein $PAT_B(i)=PAT_B(i-1)+D(i)$ and wherein (i) denotes a current timestamp, (i−1) denotes a previous timestamp, '/' denotes an integer division, R is a remainder used to avoid the accumulation of rounding errors, and PAT_M is the wraparound value of the timestamp counter of said first clock rate.

This PAT_M wraparound value is the maximum value possible for $PAT_A$ incremented by '1'.

Advantageous additional embodiments of the inventive method are disclosed in the respective dependent claims.

In principle the data recorder is suited for recording or replaying data packets, using means for converting first data packet timestamps $PAT_A$ based on a first clock rate to second data packet timestamps $PAT_B$ based on a second clock rate, said clock rates having a ratio B/A, A being derived from said first clock rate and B being derived from said second clock rate, said data recorder including the features:

if no $PAT_A$ timestamp wraparound takes place, calculating:

$$D(i)=((PAT_A(i)-PAT_A(i-1))*B+R(i-1))/A$$

$$R(i)=((PAT_A(i)-PAT_A(i-1))*B+R(i-1)) \bmod A;$$

if a $PAT_A$ timestamp wraparound takes place between i−1 and i, calculating:

$$D(i)=((PAT_A(i)+PAT\_M-PAT_A(i-1))*B+R(i-1))/A$$

$$R(i)=((PAT_A(i)+PAT\_M-PAT_A(i-1))*B+R(i-1)) \bmod A,$$

wherein $PAT_B(i)=PAT_B(i-1)+D(i)$ and wherein (i) denotes a current timestamp, (i−1) denotes a previous timestamp, '/' denotes an integer division, R is a remainder used to avoid the accumulation of rounding errors, and PAT_M is the wraparound value of the timestamp counter of said first clock rate.

Advantageous additional embodiments of the inventive apparatus are disclosed in the respective dependent claims.

DRAWINGS

Figure 2:
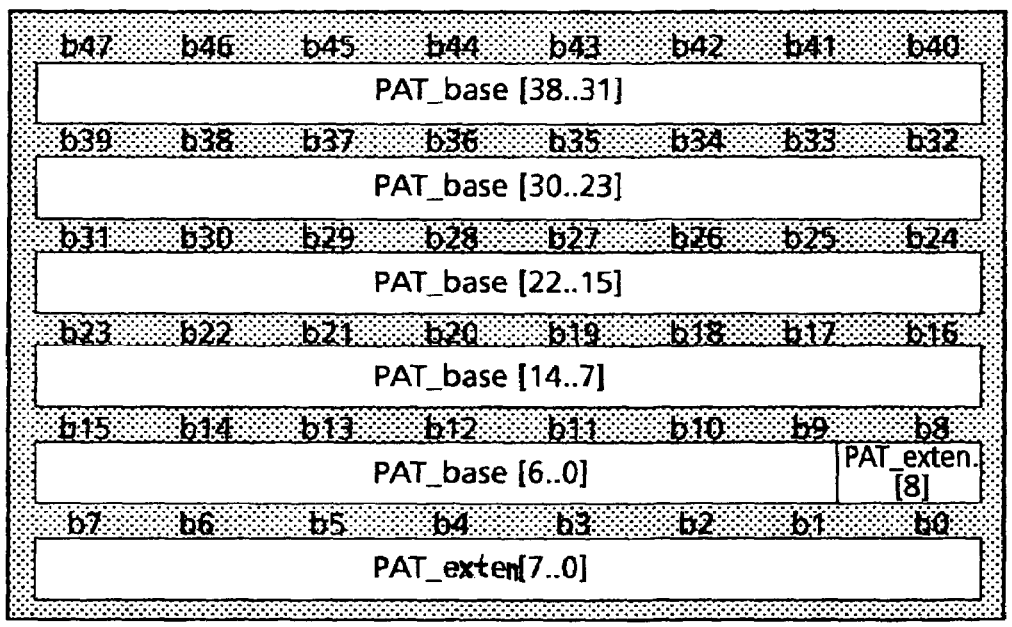
Figure 3:
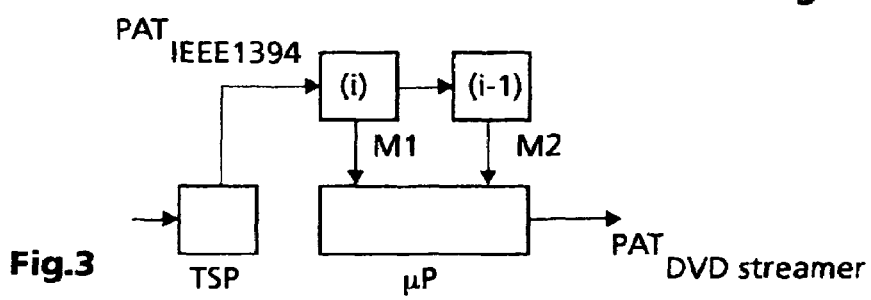

Exemplary embodiments of the invention are described with reference to the accompanying drawings, which show in:

FIG. 1 simplified block diagram for DVD Stream recording via an interface;

FIG. 2 timestamp format according to the DVD stream recording specification;

FIG. 3 simplified block diagram for a DVD Stream recording PAT calculator.

EXEMPLARY EMBODIMENTS

In FIG. 1 an application device APPD is connected to a DVD streamer unit STRU via an interface IF. To APPD belongs interface circuitry: a timestamping & buffering stage TSBI that timestamps and buffers data packets coming from APPD before passing them to IF, and a buffering & timestamping handling stage BTSHI receiving data packets from IF and handling the intermediate buffering and temporally correct delivering of the data packets to APPD.

In real-time record mode the DVD streamer receives e.g. MPEG-2 transport packets for one or more programs via the IEEE 1394 interface IF. These packets pass through a further buffering & timestamp handling stage BTSHS and a further timestamping & buffering stage TSBS to streamer unit STRU. Replayed data packets coming from STRU pass through a buffering & timing regeneration stage BTRS and a further buffering & timestamping handling stage BTSS to IF.

Dashed line A-A is the functional border between the streamer-related STRRS stages/unit TSBS, BTRS and STRU, and the interface-related IFRS stages/unit TSBI, BTSHS, BTSS, BTSHI and IF.

To the DVD streamer STR, which is depicted as a shadowed box, belong unit/stages STRU, BTSHS, TSBS, BTRS and BTSS. The timestamp format according to IEEE 1394 is based on a 24.576 MHz clock and includes two wraparound counters. The first counter output is a 12-bit cycle_offset counting from '0' to '3071' and the second counter output is a 13-bit cycle_count counting from '0' to '7999'. By passing the upper boundary limit of the counters, a wraparound to zero is executed. The wraparound of the first counter cycle_offset carries into the second cycle_count field. A complete time period causing one wraparound for cycle_count is exactly 1 sec.

For real-time data packet handling in a DVD streamer, each DVD transport packet has to carry its own timestamp. Normally, the DVD streamer would generate and record its own timestamps together with the recorded data packets. Such DVD streamer timestamps would thereafter be used in the replaying mode to output the data packets according to the original temporal location at recording time.

However, the DVD streamer includes an IEEE 1394 interface. Therefore the IEEE 1394 timestamps are already present within the DVD streamer, although their format is not suited for DVD stream recording purposes. In particular the different clock frequencies 24.576 MHz and 27.000 MHz would cause problems because high-precision conversion from one to the other is not trivial. If one could in spite of these problems make use of the IEEE 1394 timestamps, a separate DVD timestamp clock would be superfluous.

Therefore, if according to the invention for DVD stream recording the IEEE 1394 timestamps are used, their 32-bit/24.576 MHz format has to be converted into the above mentioned 48-bit/27.000 MHz DVD format that is depicted in FIG. 2, wherein PAT denotes the packet arrival time.

The PAT is composed of PAT_base having a length of 39 bits and PAT_extension having a length of 9 bits. PAT is used for the stream object information. Bit0 . . . bit31 are added to each application packet and bit0 . . . bit40 are used for the system clock reference in DVD stream recording. $PAT_{DVDstreamer}$ for DVD streamer devices has the following properties:

$$PAT\_base(i)=((system\_clock*t(i))/300) \bmod 2^{39}$$

$$PAT\_exten(i)=(system\_clock*t(i)) \bmod 300$$

$$PAT_{DVDstreamer}(i)=PAT\_base(i)*300+PAT\_exten(i)$$

wherein '/' denotes an integer division, 'i' denotes a current data packet and system_clock has the value 27.000 MHz.

For a timestamp conversion from IEEE 1394 format to DVD streamer format two problems must be considered:

The system clock conversion from 24.567 MHz to 27.000 MHz leads to a non-user-friendly factorisation of e.g. 3375/3072. Other still non-user-friendly factorisations like 1125/1024 are possible.

The 1-sec-wraparound of the IEEE 1394 timestamp counter.

The bitlength limit for integer calculation in most processor platforms is at present 32 bits. However, as mentioned above a 48-bit timestamp format is to be handled. To avoid division operations on very high-bitlength integer data types or floating point operations, the following inventive procedure is proposed. The formulas are written in C notation wherein '%' represents the modulo function.

The calculations are based on the differences between consecutive IEEE 1394 timestamps.

For i=0: $PAT_{DVDstreamer}(0)=0$, i.e. $PAT_{start}$ is advantageously zero. However, $PAT_{start}$ can have any other start value.

For all other values of 'i', temporal differences between consecutive IEEE 1394 timestamps are converted to the DVD streamer format according to:

if no IEEE1394-timestamp-wraparound { delta_27(i)=((PAT_{IEEE1394}(i)-PAT_{IEEE1394}(i-1))
    *3375+remainder(i-1))/3072 remainder(i)=((PAT_{IEEE1394}(i)-PAT_{IEEE1394}(i-1))
    *3375+remainder(i-1))%3072

} if IEEE1394-timestamp-wraparound { delta_27(i)=((PAT_{IEEE1394}(i)+PAT_MAX_{IEEE1394}-
    PAT_{IEEE1394}(i-1))*3375+remainder(i-1))/3072 remainder(i)=((PAT_{IEEE1394}(i)+PAT_MAX_{IEEE1394}-
    PAT_{IEEE1394}(i-1))*3375+remainder(i-1))%3072

} with $PAT\_MAX_{IEEE1394}=24576000$ and remainder(0)=0. Advantageously, the inclusion of a remainder calculation avoids the accumulation of rounding errors.

The calculation is carried out under the assumption that $$(PAT_{IEEE1394}(i)-PAT_{IEEE1394}(i-1))*3375<2^{BL},$$

wherein 'BL' is the bitlength of the integer calculation involved, i.e. 'BL' has in most present processor platforms a value of '32'.

The resulting PATs in the DVD streamer format are $$PAT_{DVDstreamer}(i)=PAT_{DVDstreamer}(i-1)+delta\_27(i).$$

The two elements for a $PAT_{DVDstreamer}(i)$ can be calculated by $$PAT\_exten(i)=(PAT\_exten(i-1)+delta\_27(i))\% \ 300$$

$$PAT\_base(i)=PAT\_base(i-1)+(PAT\_exten(i-1)+ \\ delta\_27(i))/300$$

This advantageously avoids division operations on 48-bit integers.

In FIG. 3, a timestamp partitioner TSP collects the required IEEE 1394 timestamps from the bitstream passing interface IF and stage BTSHS. The IEEE 1394 PAT timestamps are sequentially input to memory means M1 and M2, e.g. a shift register holding $PAT_{IEEE1394}(i)$ and $PAT_{IEEE1394}(i-1)$. In each case, the two currently required $PAT_{IEEE1394}$ values are read from M1 and M2 for input into calculator or microprocessor µP, which calculates the $PAT_{DVDstreamer}$ timestamps according to the above formulas.

Using the above processing for the calculation of the 48-bit DVD stream recording timestamp format is very efficient in particular in view of the application in a real-time system. Division operations on very high-bitlength integer data types and also floating point operations can be avoided.

The invention can be used correspondingly for any other type of interfaces and any other type of data stream recorders, e.g. CD-related data stream recorders.

The numbers given can be adapted correspondingly for other applications.

What is claimed is:

1. Method for data recording using a data recorder converting first data packet timestamps $PAT_A$ based on a first clock rate to second data packet timestamps $PAT_B$ based on a second clock rate, said clock rates having a ratio B/A, A being derived from said first clock rate and B being derived from said second clock rate, comprised of the following steps:

if no $PAT_A$ timestamp wraparound takes place, calculating (µP):

$$D(i)=((PAT_A(i)-PAT_A(i-1))*B+R(i-1))/A$$

$$R(i)=((PAT_A(i)-PAT_A(i-1))*B+R(i-1)) \bmod A;$$

if a $PAT_A$ timestamp wraparound takes place between i−1 and i, calculating (µP):

$$D(i)=((PAT_A(i)+PAT\_M-PAT_A(i-1))*B+R(i-1))/A$$

$$R(i)=((PAT_A(i)+PAT\_M-PAT_A(i-1))*B+R(i-1)) \bmod A,$$

wherein $PAT_B(i)=PAT_B(i-1)+D(i)$
and wherein (i) denotes a current timestamp (M1), (i−1) denotes a previous timestamp (M2), '/' denotes an integer division, R is a remainder used to avoid the accumulation of rounding errors, and PAT_M is the wraparound value of the timestamp counter of said first clock rate.

2. Method according to claim 1, wherein an initial value $PAT_B(0)$ of said second data packet timestamps $PAT_B$ is zero.

3. Method according to claim 1, wherein said second data packet timestamps $PAT_B$ are composed of a basic part $PAT_{BA}$ and an extension part $PAT_{EX}$ and are calculated (µP) according to $$PAT_{EX}(i)=(PAT_{EX}(i-1)+D(i)) \bmod 300$$

$$PAT_{BA}(i)=PAT_{BA}(i-1)+(PAT_{EX}(i-1)+D(i))/300.$$

4. Method according to claim 1, wherein the bitlengths of said first and second data packet timestamps are different.

5. Method according to claim 1, wherein said first timestamps stem from an interface, e.g. an IEEE 1394 interface, and wherein said second timestamps are used for recording data packets on a recorder having included said interface.

6. Data recorder for recording or replaying data packets, using means for converting first data packet timestamps $PAT_A$ based on a first clock rate to second data packet timestamps $PAT_B$ based on a second clock rate, said clock rates having a ratio B/A, A being derived from said first clock rate and B being derived from said second clock rate, said data recorder including the features:

if no $PAT_A$ timestamp wraparound takes place, calculating (µP):

$$D(i)=((PAT_A(i)-PAT_A(i-1))*B+R(i-1))/A$$

$$R(i)=((PAT_A(i)-PAT_A(i-1))*B+R(i-1)) \bmod A$$

if a $PAT_A$ timestamp wraparound takes place between i−1 and i, calculating (µP):

$$D(i)=((PAT_A(i)+PAT\_M-PAT_A(i-1))*B+R(i-1))/A$$

$$R(i)=((PAT_A(i)+PAT\_M-PAT_A(i-1))*B+R(i-1)) \bmod A,$$

wherein $PAT_B(i)=PAT_B(i-1)+D(i)$
and wherein (i) denotes a current timestamp, (i−1) denotes a previous timestamp, '/' denotes an integer division, R is a remainder used to avoid the accumulation of rounding errors, and PAT_M is the wraparound value of the timestamp counter of said first clock rate.

7. Data recorder according to claim 6, wherein an initial value $PAT_B(0)$ of said second data packet timestamps $PAT_B$ is zero.

8. Data recorder according to claim 6, wherein said second data packet timestamps $PAT_B$ are composed of a basic part $PAT_{BA}$ and an extension part $PAT_{EX}$ and are calculated (µP) according to $$PAT_{EX}(i)=(PAT_{EX}(i-1)+D(i)) \bmod 300$$

$$PAT_{BA}(i)=PAT_{BA}(i-1)+(PAT_{EX}(i-1)+D(i))/300.$$

9. Data recorder according to claim 6, wherein the bitlengths of said first and second data packet timestamps are different.

10. Data recorder according to claim 6, wherein said first timestamps stem from an interface, e.g. an IEEE 1394 interface, and wherein said second timestamps are used for recording data packets on said data recorder having included said interface.

* * * * *

UNITED STATES PATENT AND TRADEMARK OFFICE
CERTIFICATE OF CORRECTION

PATENT NO. : 7,634,174 B2
APPLICATION NO. : 10/380372
DATED : December 15, 2009
INVENTOR(S) : Adolph et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2041 days.

Signed and Sealed this

Ninth Day of November, 2010

David J. Kappos
*Director of the United States Patent and Trademark Office*